United States Patent [19]
Myhr et al.

[11] Patent Number: 5,937,681
[45] Date of Patent: Aug. 17, 1999

[54] LIGHTED MAGNIFYING KEY CHAIN

[76] Inventors: Nancy Myhr; Kent Myhr, both of 10330 1st. Ave. South, Bloomington, Minn. 55420

[21] Appl. No.: 09/044,307
[22] Filed: Mar. 19, 1998
[51] Int. Cl.[6] .................................................. A47G 29/10
[52] U.S. Cl. ..................... 70/456 R; 70/454; 206/37.1; 206/38.1; 359/803; 362/100
[58] Field of Search .............................. 70/454, 456 R; 206/37.1, 38, 38.1; 7/170; 359/803, 804, 816, 817; 362/100

[56] References Cited

U.S. PATENT DOCUMENTS

| | | | |
|---|---|---|---|
| 1,834,805 | 12/1931 | Roddis | 70/456 R |
| 1,838,494 | 12/1931 | Neuwirth | 359/817 X |
| 1,884,968 | 10/1932 | Bloch | 359/803 |
| 2,371,308 | 3/1945 | Mosch | 206/38.1 |
| 2,533,518 | 12/1950 | Scott | 70/456 R |
| 2,558,265 | 6/1951 | Mosch | 70/456 R |
| 3,296,429 | 1/1967 | Schwartz | 70/456 R X |
| 3,600,064 | 8/1971 | Walz | 359/803 |
| 4,574,505 | 3/1986 | Chiodo | 359/817 X |
| 4,577,927 | 3/1986 | Raney | 359/817 X |
| 4,763,986 | 8/1988 | Sego | 359/817 X |
| 4,927,284 | 5/1990 | Tsai | 7/165 X |
| 4,968,125 | 11/1990 | Rodriquez | 359/817 X |
| 5,150,261 | 9/1992 | Tsai | 7/165 X |
| 5,318,177 | 6/1994 | Isacson | 206/38.1 |
| 5,333,342 | 8/1994 | Huang | 7/164 X |
| 5,412,896 | 5/1995 | Morgan | 7/163 X |
| 5,642,234 | 6/1997 | Altman et al. | 359/817 X |
| 5,652,988 | 8/1997 | Appelhoff | 7/169 X |
| 5,713,232 | 2/1998 | Hodge | 70/456 R |

FOREIGN PATENT DOCUMENTS 6202008  7/1994  Japan ..................... 359/804

Primary Examiner—Lloyd A. Gall

[57] ABSTRACT

A key chain with magnifying glass is provided including a housing having a key ring mounted thereon. Also included is a magnifying glass situated on the housing.

4 Claims, 2 Drawing Sheets

LIGHTED MAGNIFYING KEY CHAIN

BACKGROUND OF THE INVENTION

1. Field of the Invention

The present invention relates to lighted magnifying glasses and more particularly pertains to a new lighted magnifying key chain for facilitating reading and other activities in areas lacking ambient light such as a vehicle within a vehicle.

2. Description of the Prior Art

The use of lighted magnifying glasses is known in the prior art. More specifically, lighted magnifying glasses heretofore devised and utilized are known to consist basically of familiar, expected and obvious structural configurations, notwithstanding the myriad of designs encompassed by the crowded prior art which have been developed for the fulfillment of countless objectives and requirements.

Known prior art lighted magnifying glasses include U.S. Pat. No. 4,982,837; U.S. Pat. No. 5,021,933; U.S. Pat. No. 3,111,152; U.S. Pat. No. 4,258,491; U.S. Pat. No. Des. 336,655; and U.S. Pat. No. 2,396,615.

In these respects, the lighted magnifying key chain according to the present invention substantially departs from the conventional concepts and designs of the prior art, and in so doing provides an apparatus primarily developed for the purpose of facilitating reading and other activities in areas lacking ambient light such as a vehicle.

SUMMARY OF THE INVENTION

In view of the foregoing disadvantages inherent in the known types of lighted magnifying glasses now present in the prior art, the present invention provides a new lighted magnifying key chain construction wherein the same can be utilized for facilitating reading and other activities in areas lacking ambient light such as a vehicle.

The general purpose of the present invention, which will be described subsequently in greater detail, is to provide a new lighted magnifying key chain apparatus and method which has many of the advantages of the lighted magnifying glasses mentioned heretofore and many novel features that result in a new lighted magnifying key chain which is not anticipated, rendered obvious, suggested, or even implied by any of the prior art lighted magnifying glasses, either alone or in any combination thereof.

To attain this, the present invention generally comprises a rigid housing having a thin generally rectangular configuration. The housing is formed of a planar rectangular top face, a planar rectangular bottom face and a thin periphery. As shown in the Figures, the periphery is defined by a pair of parallel short faces and a pair of parallel elongated faces. The housing includes a primary extent having a generally rectangular cut out formed therein adjacent to a first one of the short faces of the periphery. A secondary extent includes a rectangular member and an thin arm integrally coupled to the rectangular member. The secondary extent is pivotally coupled at an inboard end thereof to the primary extent adjacent to a second one of the short faces of the periphery. An indentation is formed in the top face of the housing on the secondary extent thereof. Such indentation facilitates the pivoting of the secondary extent with respect to the primary extent within a common plane. Formed in the first short face of the periphery is an eyelet with a key ring mounted thereon. Also included is a magnifying glass having a disk-shaped configuration mounted within the rectangular member of the secondary extent of the housing. An illumination assembly includes a bulb mounted within an interior space of the primary extent of the housing. The bulb is situated adjacent a window positioned on the top face of the housing. A push button momentary switch is mounted on a peripheral edge of the primary extent of the housing. The switch is connected between the bulb and a battery for illuminating the bulb only upon the pivoting of the secondary extent of the housing away from the primary extent.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new lighted magnifying key chain apparatus and method which has many of the advantages of the lighted magnifying glasses mentioned heretofore and many novel features that result in a new lighted magnifying key chain which is not anticipated, rendered obvious, suggested, or even implied by any of the prior art lighted magnifying glasses, either alone or in any combination thereof.

It is another object of the present invention to provide a new lighted magnifying key chain which may be easily and efficiently manufactured and marketed.

It is a further object of the present invention to provide a new lighted magnifying key chain which is of a durable and reliable construction.

An even further object of the present invention is to provide a new lighted magnifying key chain which is susceptible of a low cost of manufacture with regard to both materials and labor, and which accordingly is then susceptible of low prices of sale to the consuming public, thereby making such lighted magnifying key chain economically available to the buying public.

Still yet another object of the present invention is to provide a new lighted magnifying key chain which provides in the apparatuses and methods of the prior art some of the advantages thereof, while simultaneously overcoming some of the disadvantages normally associated therewith.

Still another object of the present invention is to provide a new lighted magnifying key chain for facilitating reading and other activities in areas lacking ambient light such as a vehicle.

Even still another object of the present invention is to provide a new lighted magnifying key chain that includes a housing having a key ring mounted thereon. Also included is a magnifying glass situated on the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
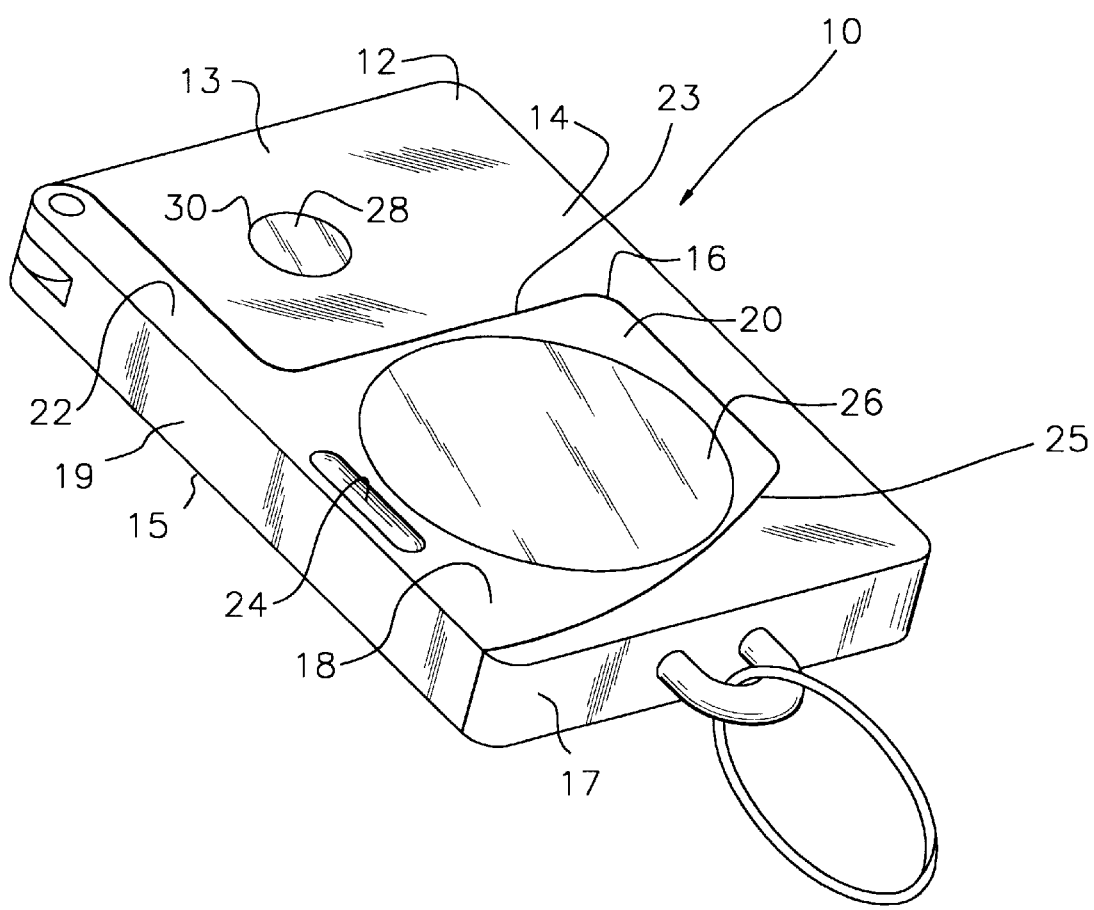
FIG. 1 is a perspective view of a new lighted magnifying key chain according to the present invention.
Figure 2:
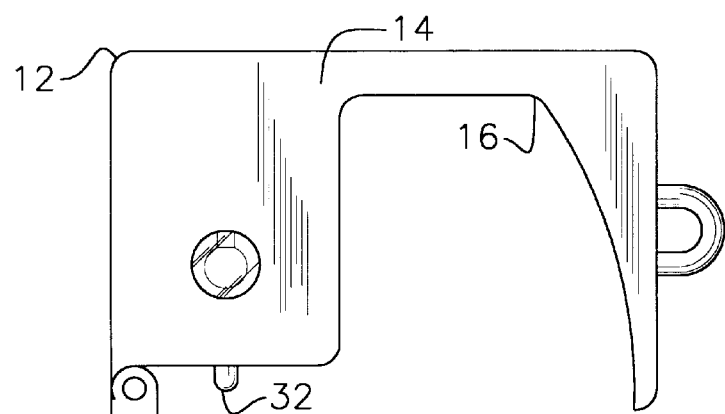
FIG. 2 is a top view of the present invention.
Figure 3:
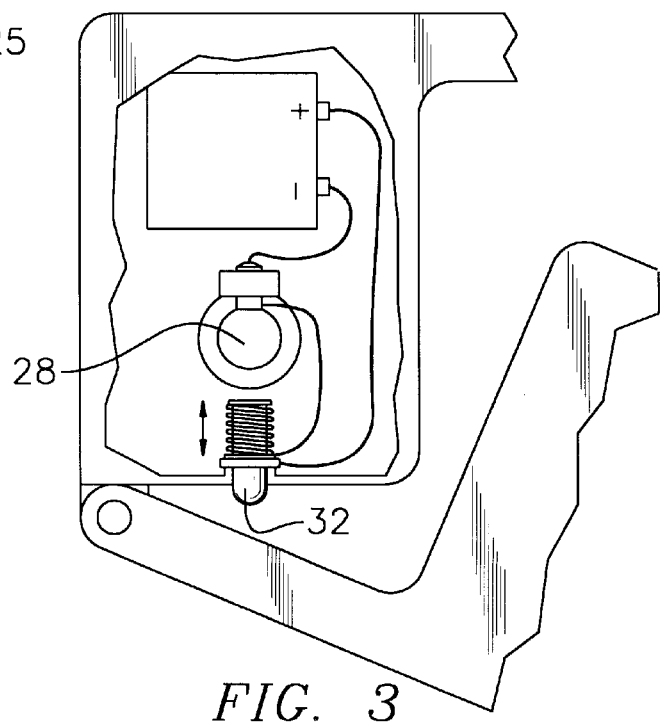
FIG. 3 is a cut-away view of the housing of the present invention showing the circuitry situated therein.

With reference now to the drawings, and in particular to FIGS. 1 through 3 thereof, a new lighted magnifying key chain embodying the principles and concepts of the present invention and generally designated by the reference numeral 10 will be described.

The present invention, designated as numeral 10, includes a rigid housing 12 having a thin generally rectangular configuration. The housing is formed of a planar rectangular top face 13, a planar rectangular bottom face 15 and a thin periphery. As shown in the Figures, the periphery is defined by a pair of parallel short faces 17 and a pair of parallel elongated faces 19. The housing includes a primary extent 14 having a generally rectangular cut out 16 formed therein adjacent to a first one of the short faces of the periphery. The cut out preferably defines at least ½ a surface area of the housing.

A secondary extent 18 includes a trapezoidal member 20 and an thin arm 22 integrally coupled to the trapezoidal member. Both the trapezoidal member and cut out of the primary extent have a pair of perpendicular linear edges 23 and an arcuate edge 25. The arm preferably has a width which is less than ¼ that of the trapezoidal member. The secondary extent is pivotally coupled at an inboard end thereof to the primary extent adjacent to a second one of the short faces of the periphery. As shown in FIGS. 1 & 2, the trapezoidal member and arm of the secondary extent together define one of the long faces of the periphery of the housing.

An indentation 24 is formed in the top face of the housing on the secondary extent thereof. Such indentation facilitates the pivoting of the secondary extent with respect to the primary extent within a common plane. Formed in the first short face of the periphery of the housing is an eyelet with a key ring mounted thereon.

Also included is a magnifying glass 26 having a disk-shaped configuration mounted within the trapezoidal member of the secondary extent of the housing. The magnifying glass preferably extends through an entire thickness of the housing.

An illumination assembly includes a bulb 28 mounted within an interior space of the primary extent of the housing. The bulb is situated adjacent a window 30 positioned on the top face of the housing. A push button momentary switch 32 is mounted on a peripheral edge of the primary extent of the housing. The switch is connected between the bulb and a battery which is also situated within the primary extent of the housing. The switch serves for illuminating the bulb only upon the pivoting of the secondary extent of the housing away from the primary extent.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An illuminated key chain with magnifying glass comprising:

a substantially rectangular housing including a first extent and a second extent pivotally coupled together, the first extent forming three sides of the substantially rectangular housing and the second extent forming a fourth side of the substantially rectangular housing;

a light situated on the first extent of the housing;

a battery for providing electrical power to the light;

a switch is positioned between the first and second extents of the housing for providing power from the battery to the light upon the pivoting of the first and second extents away from each other; and a magnifying glass situated on the second extent of the housing.

2. An illuminated key chain with magnifying glass as set forth in claim 1 wherein the extents remain in a single plane when pivoting.

3. An illuminated key chain with magnifying glass as set forth in claim 1 including a key ring mounted on the first extent of the housing.

4. A key chain with illuminated magnifying glass comprising, in combination:

a rigid housing having a thin rectangular configuration defined by a planar rectangular top face, a planar rectangular bottom face and a thin periphery defined by a pair of parallel short faces and a pair of parallel elongated faces, the housing including a primary extent having a generally rectangular cut out formed therein adjacent to a first one of the short faces of the periphery, a secondary extent including a member and a thin arm integrally coupled to the member and further pivotally coupled at an inboard end thereof to the primary extent adjacent to a second one of the short faces of the periphery, an indentation formed in the top face of the housing on the secondary extent thereof for facilitating the pivoting of the same with respect to the primary extent within a common plane, and an eyelet formed in the first short face of the periphery with a key ring mounted thereon;

a magnifying glass having a disk-shaped configuration mounted within the member of the secondary extent of the housing; and an illumination assembly including a bulb mounted within an interior space of the primary extent of the housing adjacent a window positioned on the top face thereof and a push button momentary switch mounted on a peripheral edge of the primary extent of the housing and connected between the bulb and a battery for illuminating the bulb only upon the pivoting of the secondary extent of the housing away from the primary extent.

* * * * *